Patented Feb. 25, 1930

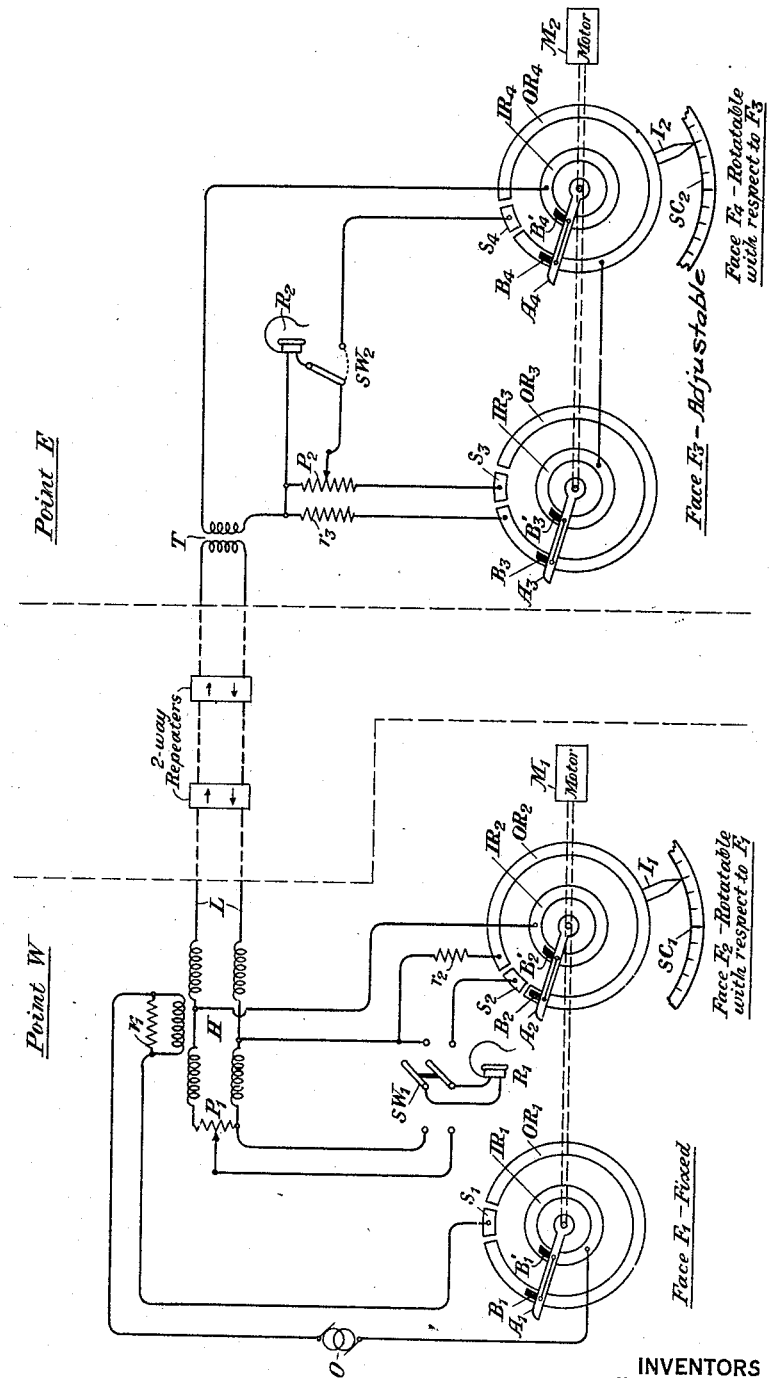

1,748,192

UNITED STATES PATENT OFFICE

JOSHUA P. SATTERTHWAITE, OF WESTFIELD, NEW JERSEY, AND JAMES E. DINGMAN, OF BROOKLYN, NEW YORK, ASSIGNORS TO AMERICAN TELEPHONE AND TELEGRAPH COMPANY, A CORPORATION OF NEW YORK

MEASUREMENT OF ECHOES

Application filed October 30, 1928. Serial No. 316,016.

This invention relates to the measurement of echoes, and more particularly to the measurement of echoes in long repeated signal transmission circuits, which echoes may be of such delay and volume as to affect seriously the signal transmission.

One object of the invention is the measurement of "near-end" or "talker" echoes with respect to the delay or transmission time of the echoes.

Another object of the invention is the measurement of the strength or volume of the echo waves returning to the "near-end".

A further object is the measurement of the delay and the strength of the "listener" echoes at the "far-end".

A still further object of the invention is the measurement of echoes as indicated above in a simple and practical manner suitable for use at transmission desks or testboards in large offices.

According to one feature of the invention, a commutator arrangement at the talker end is associated with a source of tone and a receiver, and is adapted to indicate in simple fashion the time elapsing between the sending into the circuit of alternating current impulses and the arrival of the echoes at the talker point.

In accordance with a second feature of the invention, a potentiometer is employed at the talker end, and a switch associated with the receiver is adapted to be thrown to two positions alternately to give a comparison between the volume of the outgoing impulses and the volume of the echoes.

In accordance with a third feature of the invention, there is employed at the listener point apparatus somewhat similar to that used at the talker end of the circuit for indicating the strength of the listener echoes and the delay between the arrival at the listener point of the original wave and the return to that point of the echo.

The invention will be more clearly understood when the following detailed description is read with reference to the accompanying drawing, which shows diagrammatically and in part schematically a desirable embodiment of the invention including the measuring apparatus employed at the near-end and the apparatus used at the far-end for measuring the listener echoes.

A two-way transmission circuit is shown extending from point W, which is understood to be the near or talker end of the circuit, to point E, which is the far or listener end. The transmission line L, as is indicated in the drawing, includes a plurality of two-way repeaters.

At point W there is shown a commutator arrangement having two rotatable arms $A_1$ and $A_2$ connected to a common shaft and designed to be rotated by the motor $M_1$ or by other suitable driving apparatus. The arm $A_1$ is associated with face $F_1$, which has an outer ring $OR_1$ and an inner ring $IR_1$. Carried on the arm $A_1$ are two brushes $B_1$ and $B_1'$, the former associated with the outer ring $OR_1$ and the latter with the inner ring $IR_1$. These two brushes are electrically interconnected. The outer ring $OR_1$ is segmented, including the short segment $S_1$ insulated from the rest of the ring.

The rotatable commutator arm $A_2$ is associated with a second face $F_2$ which has an outer ring $OR_2$ and an inner ring $IR_2$. Brushes $B_2$ and $B_2'$ are carried on the arm $A_2$ and are associated respectively with the outer ring $OR_2$ and the inner ring $IR_2$. These brushes are electrically interconnected. The outer ring $OR_2$ is segmented, including the short segment $S_2$ insulated from the rest of the ring. This face $F_2$ carries an index arm $I_1$, which is associated with a scale $SC_1$.

As is indicated on the drawing, the commutator face $F_1$ may be fixed, while the commutator face $F_2$ is adapted to be rotated with respect to face $F_1$.

A hybrid coil H is associated with the transmission line L and has connected to its net terminals a potentiometer $P_1$. Resistances $r_1$ and $r_2$ are connected as shown in the drawing. An oscillator O or any other suitable source of tone is associated with the commutator face $F_1$, as indicated, and a telephone receiver $R_1$ is associated with the face $F_2$, the connections of this receiver being controlled by a switch $SW_1$.

The commutator faces $F_1$ and $F_2$ are adjusted so that with face $F_1$ in its fixed position and face $F_2$ in such a position that the indicator arm $I_1$ points to zero on the scale $SC_1$, brush $B_1$ will make contact with segment $S_1$ and brush $B_2$ will make contact with segment $S_2$ at the same time. When the commutator arms are rotated at a suitable speed, intermittent contact is made between brush $B_1$ and segment $S_1$ and an interrupted tone, for instance a 1,000-cycle tone, is sent out over the line L. After a brief lapse of time a certain amount of the tone sent out over the line will return to the point W as reflected current or echo. The strength of the echo will, of course, depend upon the degree of unbalance at the various repeater points, and each component returned to the measuring point will have a delay or transmission time dependent upon the distance between the measuring and the point of unbalance. If the receiver $R_1$ is connected between the line and the commutator face $F_2$ by the throwing of switch $SW_1$ to the right, the returned currents will be detected in the receiver. The face $F_2$ is now rotated with respect to face $F_1$ until echoes are heard in the receiver $R_1$. Since the face $F_1$ is fixed at a normal position, and since the indicator $I_1$ carried by the face $F_2$ travels over the scale $SC_1$, the displacement of face $F_2$ with respect to face $F_1$ is clearly indicated. From this displacement and from the speed of rotation of the commutator arms it is, of course, a simple matter to determine the time which it has taken the waves from the oscillator O to travel out over the line L and be reflected back from a repeater point to the talker point W.

As has been indicated above, the transmission line L in which the echoes are to be measured is connected to the line terminals of the hybrid coil H. When measuring echoes under operating conditions, the far-end of the line L should be terminated by a subset, or in some other way there should be a simulation of a normal connection. If the object is to study echoes from unbalances at its intermediate points, it would be preferable to terminate the far-end of the line by a network to reduce echoes from that point. The potentiometer $P_1$, which is connected to the net terminals of the coil, is given a resistance which will approximately balance the line impedance. The resistances $r_1$ and $r_2$ have such values that the impedance of the hybrid coil as seen from the line is approximately equal to the impedance of the line. These resistances furthermore balance each other, and consequently practically none of the echo returned from the line will reach the potentiometer $P_1$. If, now, it is desired to measure the volume of the echo due to the unbalance at any repeater point, the commutator face $F_2$ is positioned with respect to face $F_1$ so that contact is made between the brush $B_2$ and the segment $S_2$ after a certain delay following the breaking of contact between brush $B_1$ and segment $S_1$ of face $F_1$.

When brush $B_2$ makes contact with the larger section of the outer ring $OR_2$, echoes returning from the line L will pass by way of the bridge terminals of the hybrid coil H to the resistance $r_2$. If, now, the switch $SW_1$ is thrown to the right, the receiver $R_1$ will be substituted for the resistance $r_2$ during the brief period when the brush $B_2$ is in contact with segment $S_2$, and the receiver will detect a portion of the echo reaching point W at a definite time after the original impulse was sent out. The impedance of the receiver is made equal to the resistance $r_2$.

If the switch $SW_1$ is thrown to the left, a definite fraction of the outgoing impulse from the oscillator is detected in the receiver $R_1$, the fraction being determined by the setting of the potentiometer $P_1$. It will now be understood that if the switch $SW_1$ is thrown alternately to the right and to the left, and if the potentiometer $P_1$ is adjusted until equal sounds are heard in the receiver $R_1$ for both positions of the switch, the volume of the returning echo impressed on the receiver during the contact between brush $B_2$ and segment $S_2$ is readily compared with the outgoing impulse.

If the face $F_2$ is rotated to various positions with respect to face $F_1$ and the operations just described are repeated, an indication may be had of the volume of the echo arriving at the measuring point after a lapse of any given time from the sending into the line of the alternating current impulses.

It remains to consider the measurement of listener echoes at the far-end of the circuit, represented by point E. At this point the line L is associated through a transformer T with a receiver $R_2$ and a commutator arrangement similar to the one employed at the talker end. The rotatable arms $A_3$ and $A_4$ are connected to a common shaft and designed to be rotated by the motor $M_2$, which is synchronized in any well known manner with the motor $M_1$ at the talker end. Arm $A_3$ is associated with face $F_3$, which has an outer ring $OR_3$ and an inner ring $IR_3$. Carried on the arm $A_3$ are two brushes $B_3$ and $B_3'$, the former associated with the outer ring $OR_3$ and the latter with the inner ring $IR_3$. These brushes are electrically interconnected. The outer ring $OR_3$ is segmented, including the short segment $S_3$ insulated from the rest of the ring. Likewise, the arm $A_4$ associated with face $F_4$ carries electrically interconnected brushes $B_4$ and $B_4'$, which are associated respectively with the outer ring $OR_4$ and the inner ring $IR_4$. The ring $OR_4$ is segmented, including the short segment $S_4$ insulated from the rest of the ring. The face $F_4$ carries an index arm $I_2$, which is associated with scale $SC_2$, and this face is rotatable with respect to the face $F_3$ in any position. It is to be noted that there is an electrical connection between ring $IR_3$ of face $F_3$ and ring $OR_4$ of face $F_4$. A resistance $r_3$ and a potentiometer $P_2$ are included in the circuit, as shown in the drawing, and the connections of the receiver $R_2$ are controlled by a switch $SW_2$.

It will be understood, of course, that the alternating current impulses sent from the oscillator O at the point W are employed for the measurements made at point E.

When the brushes $B_3$ and $B_4$ make contact with the larger segments of the outer rings $OR_3$ and $OR_4$, respectively, the line L is terminated by the resistance $r_3$, which is approximately equal to the line impedance. The resistance of potentiometer $P_2$ is equal to the resistance $r_3$. When the brush $B_3$ makes contact with the small segment $S_3$ potentiometer $P_2$ is substituted for resistance $r_3$. If, now, the switch $SW_2$ is thrown to the left, the receiver $R_2$ receives a definite fraction of the wave arriving from the line. The operator listening to this receiver now adjusts the face $F_3$ so that the contact between brush $B_3$ and segment $S_3$ occurs at the instant of arrival of the wave transmitted from the point W. Throughout the rest of the rotation of the contact arms the potentiometer $P_2$ and the receiver $R_2$ are disconnected from the line; accordingly, the listener echoes do not affect the receiver $R_2$, with the switch $SW_2$ thrown to the left, during this long contact.

With the face $F_3$ adjusted as described above, the face $F_4$ is rotated to a position such that contact between brush $B_4$ and segment $S_4$ occurs at a definite time after the contact is broken between brush $B_3$ and segment $S_3$ of face $F_3$. If the switch $SW_2$ is thrown to the right, the receiver $R_2$ will be connected to the end of the line L while brush $B_4$ is in contact with segment $S_4$; accordingly, the receiver $R_2$ is affected by a portion of the echo arriving after a definite delay from the arrival of the original wave. The impedance of this receiver is equal to the resistance $r_3$. It will now readily be understood that if the switch $SW_2$ is thrown alternately to the right and to the left, and if the potentiometer $P_2$ is adjusted until equal sounds are heard in the receiver $R_2$ for both positions of the switch, the echo received during the contact between brush $B_4$ and segment $S^4$ is made equal to a definite fraction of the original wave reaching the point E, the setting of the potentiometer $P_2$ giving the accurate indication of echo strength.

The delay between the arrival of the original wave and the return of the listener echo from any point of unbalance in the circuit is measured by the displacement of the commutator face $F_4$ with respect to face $F_3$, which displacement is clearly indicated on the scale $SC_2$ by the arm $I_2$.

If the face $F_4$ is rotated to various positions with respect to face $F_3$ and the operations described above are repeated, an accurate indication may be had of the volume of listener echo arriving after a lapse of any given time from the arrival of the original wave.

While the invention has been disclosed in one specific embodiment which is deemed desirable, it is to be understood that many modifications may be made within the true scope of the invention. For instance, arrangements other than that of the hybrid coil and the potentiometer at the talker end, old and well known in the art, may be employed to assist in the determination of the talker echo volume. Again, any arrangement well known in the art may be employed at point E for comparing the listener echoes with the directly transmitted wave, in place of the arrangement of receiver and potentiometer specifically shown.

What is claimed is:

1. In association with a two-way signal transmission circuit, means for sending into the circuit a series of alternating current impulses, means for receiving the currents returning over the circuit as echoes of said impulses, means associated with said receiving means for adjusting said means to select certain echoes, and indicating means associated with said adjusting means to give the measure of the adjustment made, whereby the transmission time of the selected echoes may be determined.

2. In association with a two-way signal transmission circuit, a source of tone, a receiver, a first commutator adapted to close a circuit periodically to send the tone from said source into the transmission circuit, a second commutator adapted to close a circuit periodically through said receiver to detect currents returning over the circuit as echoes of the tone currents, and means for rotating the commutator arms together, said second commutator having its face rotatable with respect to the face of said first commutator.

3. In association with a two-way signal transmission circuit, a source of tone, a receiver, a commutator arrangement having a first arm and a second arm in fixed relation thereto and a first face and a second face associated with said arms, respectively, and means for rotating said commutator arms together at a predetermined speed, said first and second faces being so segmented and connected that upon the rotation of the commutator arms said source of tone will be connected to the line to send thereover an interrupted tone and said receiver will be connected to the line at intervals corresponding to the interruptions of the tone, said second commutator face being rotatable with respect to said first commutator face, whereby selected echoes arriving over the line may be heard in the receiver and the displacement of the second face with respect to the first face will indicate the transmission time of the returning currents.

4. In association with a two-way signal transmission circuit, means for sending into the circuit a series of alternating current impulses, means for detecting currents returned over the circuit as echoes of said impulses, and a commutator arrangement associated with said sending and said detecting means for timing the sending of the impulses and indicating the delay of the echoes.

5. The method of measuring the transmission time of echoes in a two-way transmission circuit which consists in sending into the circuit series of alternating current impulses, detecting the currents returned over the circuit as echoes of said impulses, and ascertaining the delay of the echoes from the relation between the timing of the impulse sending and the detection.

6. The method of measuring echoes in a two-way transmission circuit which consists in sending into the circuit series of alternating current impulses, impressing alternately on a detecting device a portion of the outgoing impulses and a portion of the echoes returning to the measuring point, and comparing the two quantities so impressed.

7. The method of measuring echoes in a two-way transmission circuit which consists in sending into the circuit series of alternating current impulses, impressing alternately on a detecting device a portion of the outgoing impulses and a portion of the echoes returning to the measuring point, effecting an adjustment to bring the two quantities to equality, and determining the strength of the echoes from the adjustment so made.

8. In association with a two-way transmission circuit, means for sending into the circuit a series of alternating current impulses, a detecting means, means for impressing alternately on said detecting means a portion of the outgoing impulses and a portion of the echoes returning to the measuring point after a certain delay, and means for comparing the strength of the outgoing impulses and the strength of the returning echoes.

9. In association with a two-way transmission circuit, means for sending into the circuit a series of alternating current impulses, a detecting means, means for impressing alternately on said detecting means a portion of the outgoing impulses and a portion of the echoes returning to the measuring point after a certain delay, and means for adjusting the two quantities impressed on the detecting means to bring said quantities to an equality, whereby the strength of the returning echoes may be determined.

10. The method of measuring listener echoes in a two-way transmission circuit which consists in sending into the circuit from the talker point a series of alternating current impulses, impressing on a detecting device at the listener point the resulting waves, impressing on said detecting device the echoes arriving at the listener point, determining the time elapsing between the arrival of the original wave and the arrival of the listener echo, and comparing the strength of the original wave and said echo.

11. The method of measuring listener echoes in a two-way transmission circuit which consists in sending into the circuit from the talker point a series of alternating current impuses, impressing on a detecting device at the listener point a portion of the resulting wave, impressing on said detecting device the echoes arriving at the listener point, effecting an adjustment to bring a portion of the wave to equality with the echoes, and determining the delay of the echoes from such adjustment.

12. The method of measuring listener echoes in a two-way transmission circuit which consists in sending into the circuit from the talker point a series of alternating current impulses, impressing alternately on a detecting device at the listener point a certain fraction of the resulting wave and the echoes arriving at the listener point after a certain delay, and comparing the two quantities so impressed to determine the strength of the echoes.

13. The method of measuring listener echoes in a two-way transmission circuit which consists in sending into the circuit from the talker point a series of alternating current impulses, impressing alternately on a detecting device at the listener point a certain fraction of the resulting wave and the echoes arriving at the listener point after a certain delay, effecting an adjustment to bring the two quantities to an equality, and determining the strength of the echoes from the adjustment so made.

In testimony whereof, we have signed our names to this specification this 27th day of October, 1928.

JOSHUA PAUL SATTERTHWAITE.
JAMES E. DINGMAN.